United States Patent
Schmid et al.

(10) Patent No.: US 6,659,046 B2
(45) Date of Patent: Dec. 9, 2003

(54) INFLATABLE, SPLIT ELIZABETHAN COLLAR

(76) Inventors: Linda Anne Schmid, 22961 Bartolome, Mission Viejo, CA (US) 92692; John A. Rasile, 22961 Bartolome, Mission Viejo, CA (US) 92692

( * ) Notice: Subject to any disclaimer, the term of this patent is extended or adjusted under 35 U.S.C. 154(b) by 0 days.

(21) Appl. No.: 10/281,245

(22) Filed: Oct. 28, 2002

(65) Prior Publication Data

US 2003/0150401 A1 Aug. 14, 2003

Related U.S. Application Data

(60) Provisional application No. 60/355,522, filed on Feb. 11, 2002.

(51) Int. Cl.$^7$ .............................. H01K 27/00; B63C 9/08
(52) U.S. Cl. ........................ 119/815; 119/855; 119/856; 441/123
(58) Field of Search ................................ 119/815, 850, 119/855, 856; 128/845, 846, 869, 874; 2/468, 135, 141.2; 441/123

(56) References Cited

U.S. PATENT DOCUMENTS

| | | | |
|---|---|---|---|
| 986,728 A | | 3/1911 | Lee |
| 3,036,554 A | * | 5/1962 | Johnson ..................... 119/821 |
| 3,072,098 A | | 1/1963 | Boemle |
| 3,750,205 A | * | 8/1973 | Pfeifer ........................ 441/123 |
| 3,765,412 A | * | 10/1973 | Ommaya et al. ............ 128/846 |
| 4,200,057 A | * | 4/1980 | Agar .......................... 424/9.8 |
| 4,476,814 A | | 10/1984 | Miller |
| 4,800,871 A | * | 1/1989 | Florjancic .................... 602/18 |
| 5,060,661 A | * | 10/1991 | Howard ...................... 128/845 |
| 5,133,084 A | * | 7/1992 | Martin .......................... 2/468 |
| 5,133,295 A | | 7/1992 | Lippincott |
| 5,161,352 A | | 11/1992 | Schneider et al. |
| 5,197,414 A | * | 3/1993 | Kanakura .................... 119/839 |
| 5,349,927 A | | 9/1994 | Campbell |
| 5,402,535 A | * | 4/1995 | Green ........................... 2/468 |
| 5,421,760 A | * | 6/1995 | Blaga ......................... 441/123 |
| 5,697,328 A | | 12/1997 | Hunter |
| 5,779,512 A | * | 7/1998 | Rupert ....................... 441/123 |
| 5,787,842 A | | 8/1998 | Scmoldas |
| 5,797,354 A | * | 8/1998 | Marschall ................... 119/815 |
| 6,044,802 A | | 4/2000 | Schmid et al. |
| 6,058,517 A | * | 5/2000 | Hartunian ...................... 2/468 |
| 6,244,222 B1 | * | 6/2001 | Bowen ....................... 119/856 |
| 6,463,887 B1 | * | 10/2002 | Thomas ..................... 119/850 |
| 2002/0072287 A1 | * | 6/2002 | Courtney ................... 441/123 |

FOREIGN PATENT DOCUMENTS

| | | | |
|---|---|---|---|
| FR | 2561201 | * | 3/1984 |
| GB | 2082979 | * | 3/1982 |

* cited by examiner

*Primary Examiner*—Yvonne Abbott
(74) *Attorney, Agent, or Firm*—Hoffman, Wasson & Gitler

(57) ABSTRACT

An Elizabethan collar is circular in shape having an outer periphery. A central aperture forms an opening for the animal's head. The collar is inflatable, either having a valve filling the collar or a circular bladder placed within the collar and having a valve extending through the cover of the collar for access by the user. In addition to being inflatable, a foam layer may be provided in the collar or the collar may be permanently preinflated without a valve. With the provision of a valve, the foam can be compressed and the valve closed. With the valve closed, the foam will not re-expand until the user opens the valve. This allows the collar to assume a compact configuration when not in use. The collar can be split from the inner periphery formed by the central aperture to the outer periphery of the collar. The two edges formed by the split are joined to one another. The split allows the collar to be put around the animal's neck without sliding the collar over the animal's head. The collar is secured to the animal by a shawl having a drawstring.

11 Claims, 4 Drawing Sheets

INFLATABLE, SPLIT ELIZABETHAN COLLAR

This application claims the benefit of provisional application Serial No. 60/355,522, filed Feb. 11, 2002.

BACKGROUND OF THE INVENTION

Many animals will bite their wounds, and this hinders the-proper healing process. Elizabethan collars have been used for many years by veterinarians to keep animals from licking or biting wounds or sores. The typical Elizabethan collar is an opaque plastic cone having a frustro-conical shape, and looks much like a lampshade. The small end of the collar is placed around the animal's neck, and the collar surrounds the sides of the animal's head. Although the Elizabethan collar is effective in preventing an animal from biting or licking or scratching wounds on its head, it is very uncomfortable for the animal. It makes eating, sleeping, moving, hearing and seeing very difficult. Many animals feel threatened, depressed or disoriented while wearing the collar. Animals often collide with doors and walls because of the restricted view.

A modified type of Elizabethan collar is disclosed in U.S. Pat. No. 5,133,295 (Lippincott). It is made of two disks of non-resilient material that are secured about an animal's neck. The non-resilient material is thin and floppy and does not have the ability to return to its original position, and therefore does not present an effective barrier to keep an animal from turning its head to reach its body. The two disks are sewn together at their central aperture but otherwise move independently.

Another restraining collar is disclosed in U.S. Pat. No. 4,476,814 (Miller). The collar is made of a foam material such as polyurethane, polystyrene or foamed natural or synthetic rubber. The collar is toroidal in shape and is provided with a gap 22. The collar has a central neck-receiving space 16. The gap is wide enough for the collar to be placed on the neck of an animal. The collar includes a drawstring extending through the body of the collar and is used to close the gap. The central neck-receiving hole 16 is not adjustable in size. Without being adjustable for size, the collar will most likely leave a space between the aperture and the neck. The collar will be able to slip up and down the neck, and it is possible that an animal can have a paw become entrapped between the collar and its neck.

U.S. Pat. No. 6,044,802 (Schmid) discloses a collar having the shape of a round pillow with a central aperture. A shawl about the central aperture allows the sizing of the collar to the animal's neck.

It is an object of the invention to provide a restraint collar that prevents an animal from interfering with the healing process of its own wounds or sores.

It is another object of the invention to provide a restraint collar that is adjustable in size.

It is a further object of the invention to provide a restraint collar that is inflatable, preinflated or contains reinflatable foam.

It is another object of the invention to provide an Elizabethan collar that can be put on the animal without sliding it over the animal's head.

It is still another object of the invention to provide a restraint collar that is easy to use for the animal's owner, and yet comfortable for the animal.

It is yet another object of the invention to provide a restraint collar that is inexpensive and easy to manufacture.

These and other objects of the invention will become clear to one of ordinary skill in the art after reviewing the disclosure of the invention that follows.

SUMMARY OF THE INVENTION

An Elizabethan collar is circular in shape having an outer periphery. A central aperture forms an opening for the animal's head. The collar is inflatable, either having a valve filling the collar or a circular bladder placed within the collar and having a valve extending through the cover of the collar for access by the user. In addition to being inflatable, a foam layer may be provided in the collar or the collar may be permanently preinflated without a valve. With the provision of a valve, the foam can be compressed and the valve closed. With the valve closed, the foam will not re-expand until the user opens the valve. This allows the collar to assume a compact configuration when not in use. The collar can be split from the inner periphery formed by the central aperture to the outer periphery of the collar. The two edges formed by the split are joined to one another. The split allows the collar to be put around the animal's neck without sliding the collar over the animal's head. The collar is secured to the animal by a shawl having a drawstring.

DETAILED DESCRIPTION OF THE INVENTION

Figure 1:
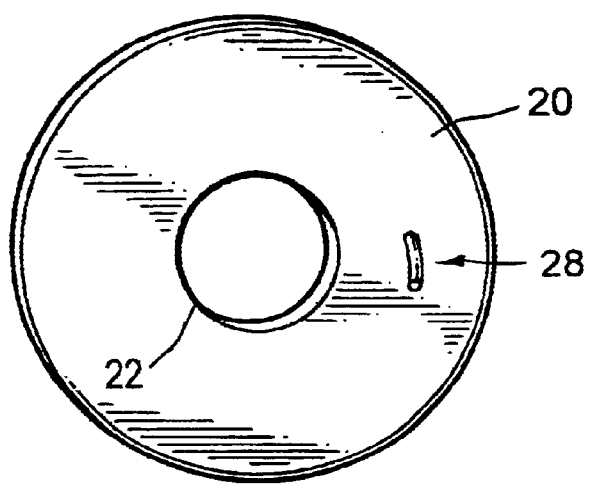
FIG. 1 is a view of a circular air bladder placed within the collar.

The air bladder used in the veterinarian recovery collar is seen in FIG. 1. The air bladder 20 has a central opening 22 to accommodate an animal's head and an outer periphery is spaced from the central aperture a sufficient distance to prevent the animal from injuring itself. The air bladder may have a valve to allow inflation and deflation of the bladder, as desired by the user. Alternatively, the bladder may be inflated and sealed when manufactured. This allows the bladder to be filled with a gas other than air.

Figure 2:
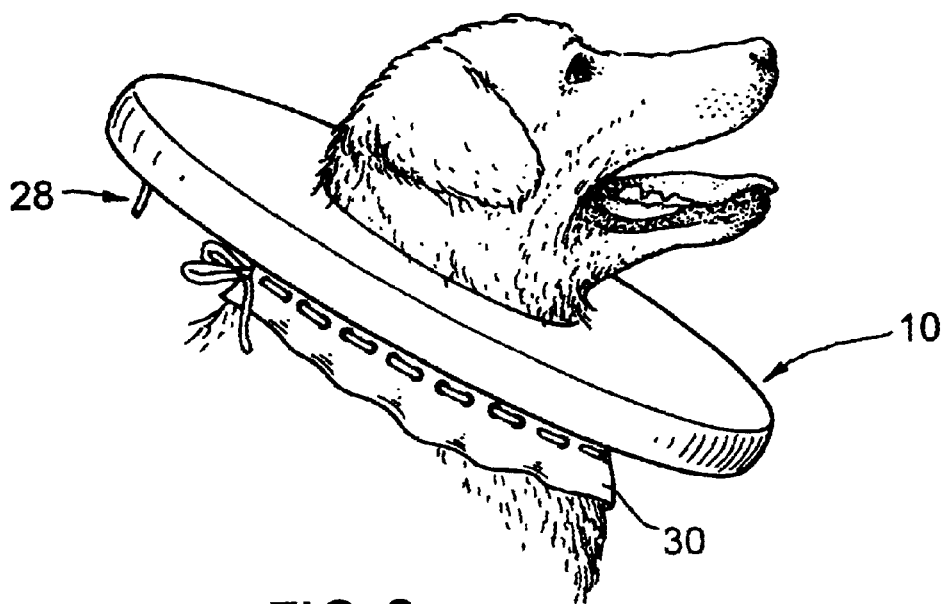
FIG. 2 is a side view of an inflatable Elizabethan collar in use.

FIG. 2 shows the air bladder incorporated into the veterinary recovery collar 10. The air bladder is covered with material, such as vinyl. A shawl 30 extends from the central aperture with a draw string to allow sizing of the collar to an individual animal. The inflation valve 28 is accessible to the user. In the alternative, the collar can be made from material that is itself inflatable, without the need for a separate air bladder. In this case, the collar resembles the air blader shown in FIG. 1 with an attched shawl. In this instance, the material comprising the recovery collar must be airtight. The valve is formed integrally with the material forming the cover to allow for inflation and deflation. In addition to being inflatable, a foam layer may be provided in the collar.

With the provision of a valve, the foam can be compressed and the valve closed. With the valve closed, the foam will not re-expand until the user opens the valve. This allows the collar to assume a compact configuration when not in use.

Figure 3:
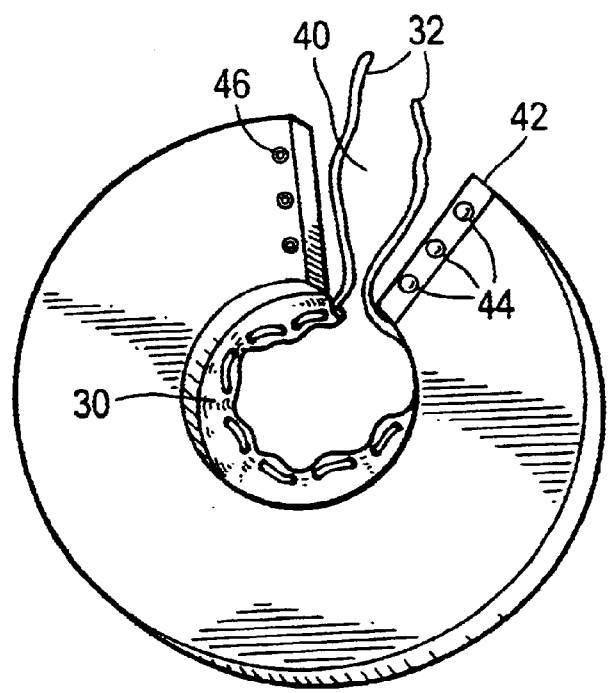
FIG. 3 is a perspective view of the collar having a split extending from the central aperture to the outer periphery.
Figure 4:
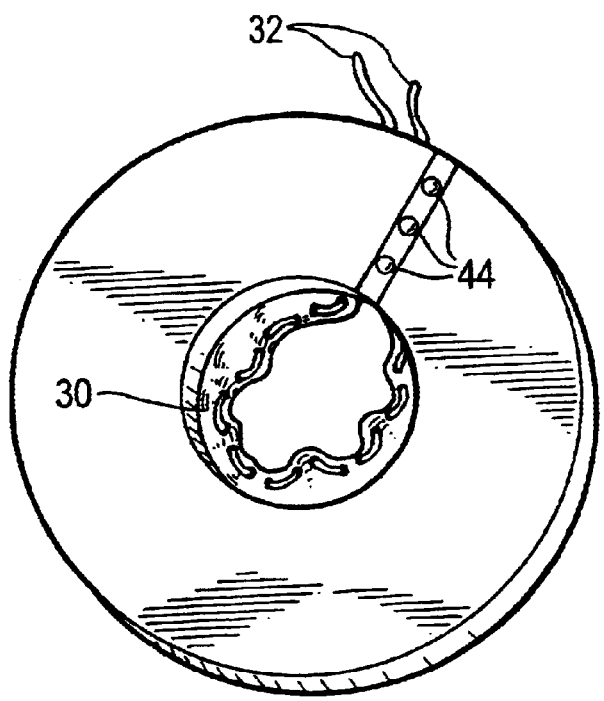
FIG. 4 is a perspective view of the split collar when the slit is closed.

FIG. 3 depicts the recovery collar having a slit 40 extending from the central aperture 22 to the periphery. This split collar may be filled with any material, such as foam, an inflatable bladder having a shape corresponding to the shape of the collar or may itself be inflatable when the material used to make the collar is airtight. If inflatable, the collar can have a nozzle to allow deflation or may be inflated and sealed when manufactured. One side of the slit is provided with a flap 42 having snaps 44. The other side of the slit is provided with mating snaps 46. When the two ends of the slit are brought together, the flap, attached to one side of the slit, overlies the other side of the slit and the mating fasteners 44, 46 are engaged to maintain the slit in a closed position. This configuration is shown in FIG. 4 with the snaps being engaged and a continuous collar formed.

Figure 5:
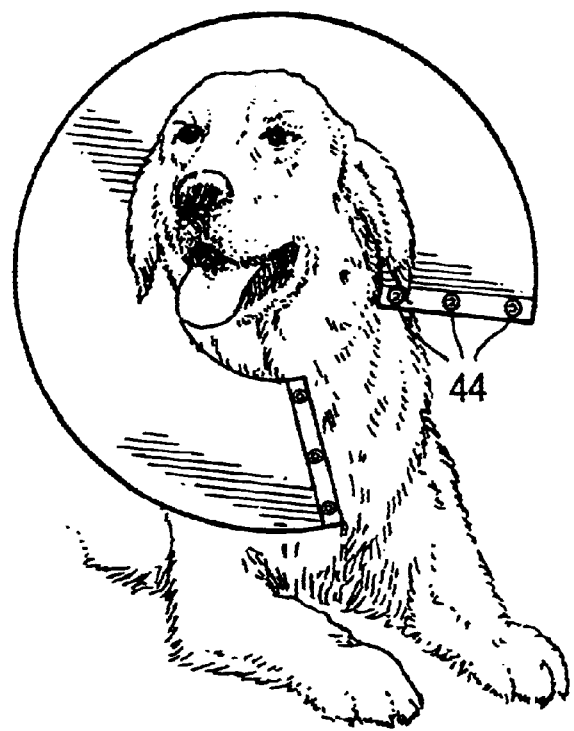
FIG. 5 is a front view of the open collar in use about an animal.

The fitting of an animal with the split ring collar is seen in FIG. 5. With the slit open, the animal's neck is passed through slit until the neck is within the central aperture. The split ring configuration prevents the need for slipping a collar over the animal's head. This allows the use of a central aperture that is closer in size to the animal's neck. This is especially useful for animals that have large heads with respect to their neck size. With such animals, the large central aperture needed to slip the collar over the head makes the proper fit about the smaller neck difficult.

Figure 6:
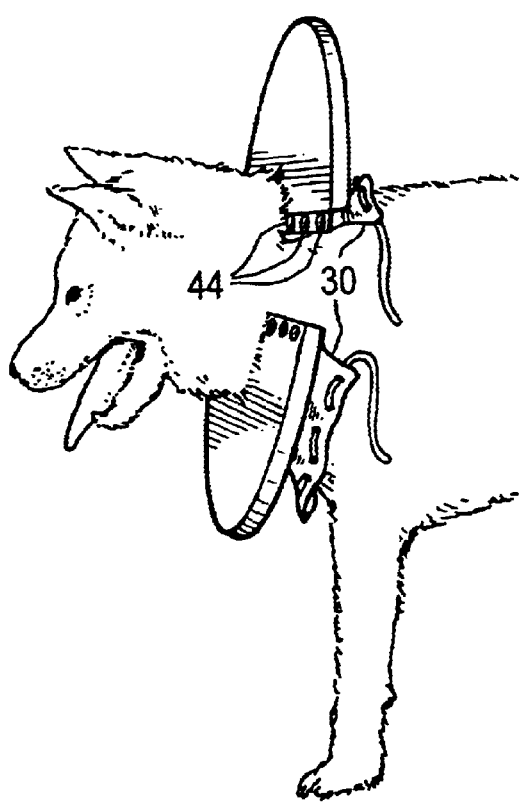
FIG. 6 is a side view of an open collar.

FIG. 6 shows the side view of the collar placed about the animal's neck in the open position. As can be seen, the shawl is also split to allow it to pass about the animal's neck. The shawl is provided with a drawstring to close it to secure the collar to the animal.

Figure 7:
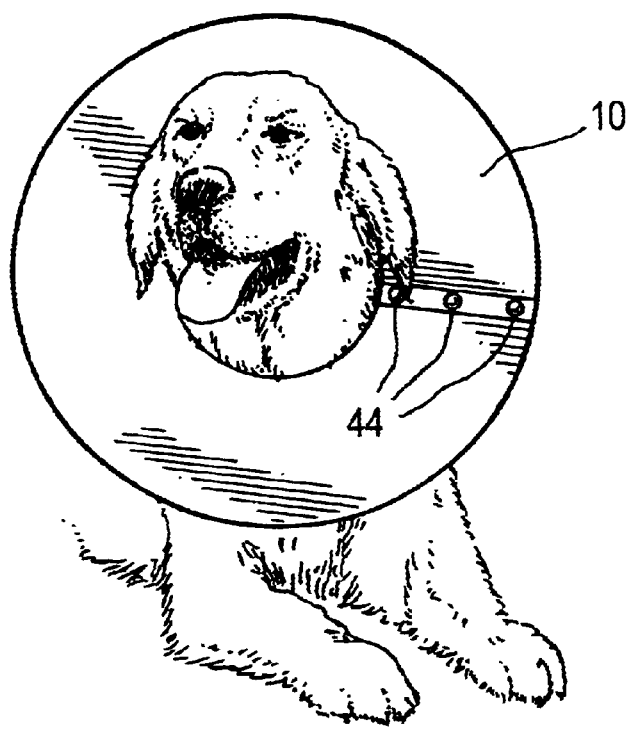
FIG. 7 is a front view of the split collar closed about an animal's neck.
Figure 8:
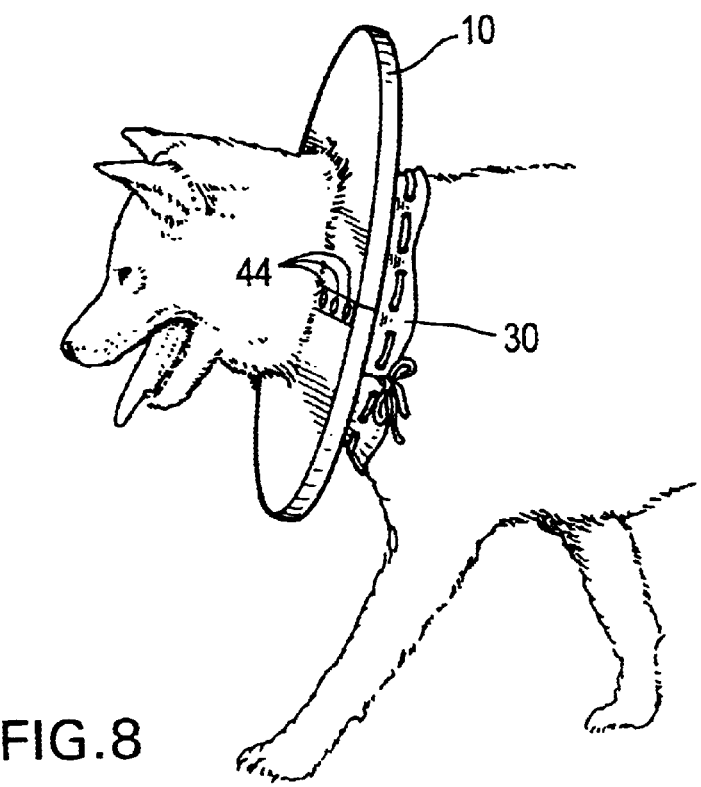
FIG. 8 is a side view of the closed collar.

FIG. 7 shows the front view of the animal having the collar closed about the animal's neck. The snaps provided on both sides of the slit are engaged with one another and the collar is closed. FIG. 8 shows the closed configuration in the side view. The drawstring is tied to close the shawl in a proper size for the particular animal. As engaged, the shawl is secure to the animal.

While a preferred embodiment of the invention has been described, variations and modifications would be apparent to one of ordinary skill in the art without departing from the scope of the invention. For instance, other mating fasteners, such as hook and loop fasteners, can be used in the place of snaps. The invention is defined by the appended claims.

We claim:

1. A restraint collar, comprising:

an upper surface and a lower surface joined to form a body having central aperture and an outer periphery, a shawl extending from said central aperture for securing said collar about an animal's neck, wherein said body is inflatable.

2. The restraint collar of claim 1, further comprising an inflation valve extending from said body.

3. The restraint collar of claim 2, further comprising a foam layer in said body.

4. The restraint collar of claim 2, further comprising an inflatable bladder in said body.

5. The restraint collar of claim 1, further comprising a slit creating two edges extending from said central aperture to said center periphery.

6. The restraint collar of claim 5, further comprising fasteners for securing said two edges together.

7. The restraint collar of claim 6, wherein said fasteners comprise snaps.

8. The restraint collar of claim 1, further comprising a drawstring in said shawl.

9. A restraint collar, comprising:

an upper surface and a lower surface joined to form a body having central aperture and an outer periphery, a shawl extending from said central aperture for securing said collar about an animal's neck, and a slit extending from said aperture to said outer periphery, creating two edges, a flap extending from a first of said edges. and fasteners affixed to said flap.

10. The restraint collar of claim 9, further comprising fasteners near said second edge for securing said two edges together.

11. The restraint collar of claim 10, wherein said fasteners comprise snaps.

\* \* \* \* \*